United States Patent [19]

Ross

[11] 4,032,443

[45] June 28, 1977

[54] REMOVAL OF GREASE AND OIL FROM PARTICULATE BED GRANULES BY BACKWASHING WITH A DETERGENT

[75] Inventor: David S. Ross, Lorain, Ohio

[73] Assignee: Sterling Drug Inc., New York, N.Y.

[22] Filed: Jan. 29, 1976

[21] Appl. No.: 653,384

[52] U.S. Cl. .................... 210/82; 210/89; 210/108; 210/140; 210/275; 210/279; 210/333 R; 210/355

[51] Int. Cl.² ......................... B01D 23/24

[58] Field of Search ............ 210/62, 79, 80, 81, 210/82, 89, 138, 139, 140, 190, 199, 221, 205, 206, 269, 274, 275, 277, 279, 281, 108, 276, 142, 209, 355

[56] References Cited

UNITED STATES PATENTS

| 3,366,241 | 1/1968 | McMorris | 210/138 |
|---|---|---|---|
| 3,613,888 | 10/1971 | Harris | 210/80 |
| 3,817,378 | 6/1974 | Ross | 210/80 |
| 3,840,117 | 10/1974 | Ross | 210/82 |
| 3,932,278 | 1/1976 | Meidl et al. | 210/82 |
| R28,458 | 7/1975 | Ross | 210/193 |

Primary Examiner—Bernard Nozick
Assistant Examiner—Frank Sever
Attorney, Agent, or Firm—Charles R. Fay

[57] ABSTRACT

Filtering solids from waste water liquids and cleaning, degreasing and restoring the filtering media through the use of cleaning compounds forced up through the filtering substances.

19 Claims, 9 Drawing Figures

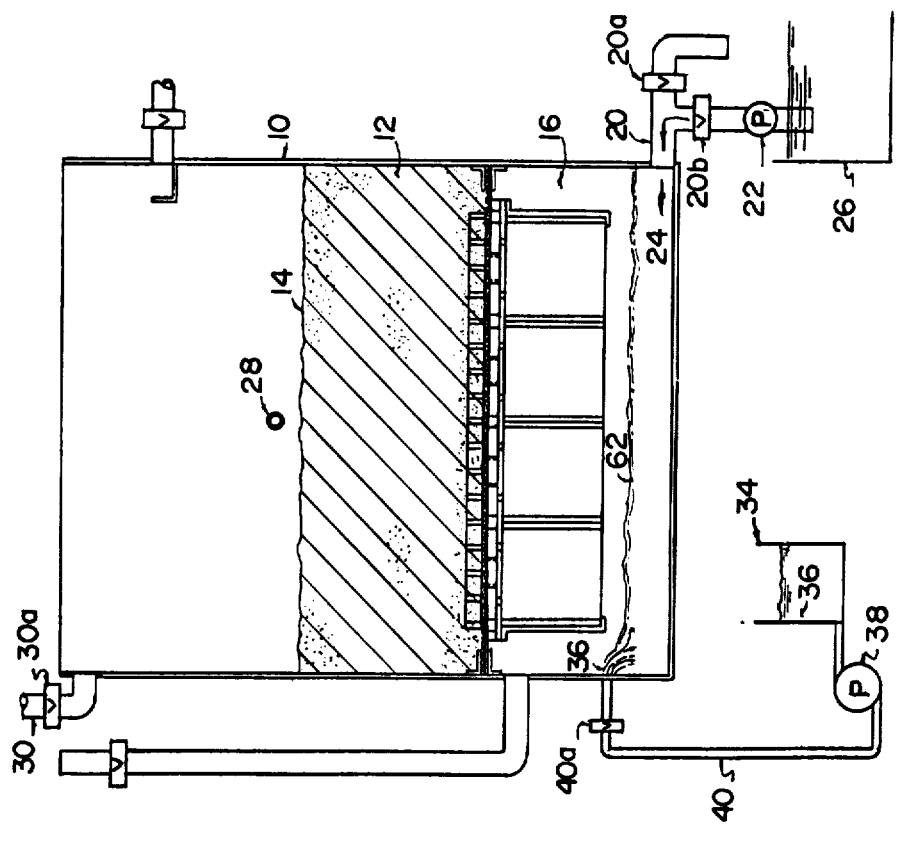
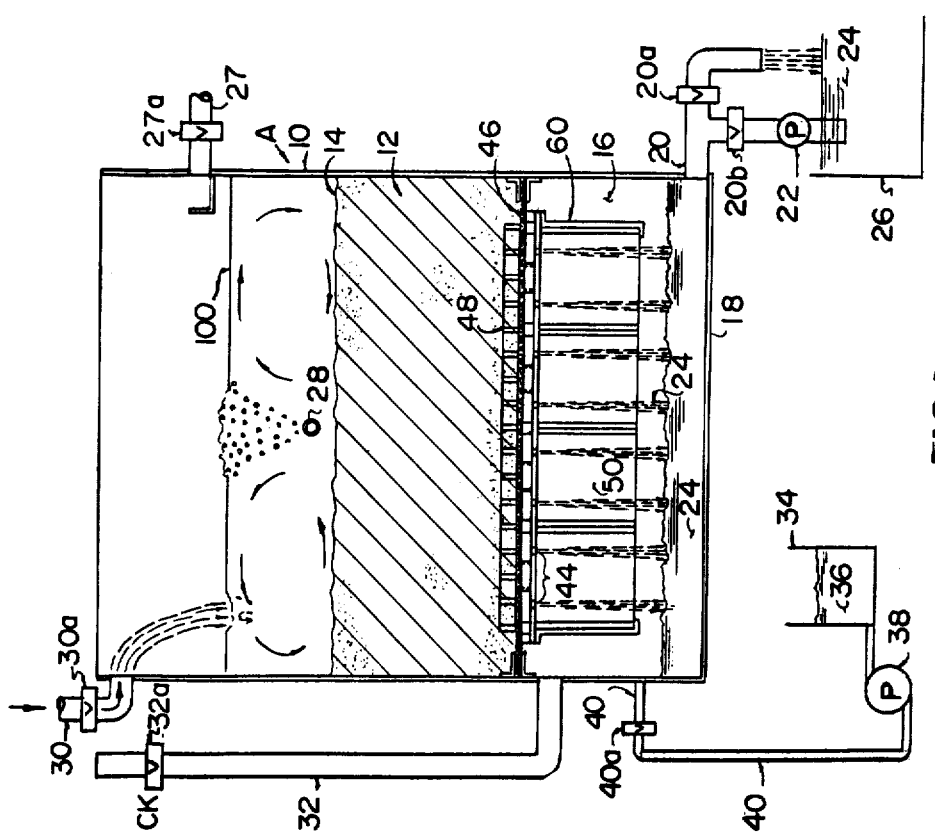

4,032,443

REMOVAL OF GREASE AND OIL FROM PARTICULATE BED GRANULES BY BACKWASHING WITH A DETERGENT

BACKGROUND OF THE INVENTION

A modern well designed and operated secondary waste treatment works, at times, is capable of the discharge of large quantities of suspended solids into the receiving waters. The effect of these suspended solids upon the receiving waters is well-known, and has resulted in various Regulatory Agencies establishing maximum limits of suspended solids that may be legally discharged into certain waters.

The need to control the discharge of suspended solids, and insure water quality is most effectively met by filtration of the treated waste prior to discharge to receiving waters.

Initially, the filters that are utilized primarily for potable water filtration were adapted to the direct filtration of treated waste water with limited success. These types of filters are extremely limited in solids capture capacity, and have little or no tolerance for solids shock loadings.

A very effective waste water filter has been developed and is described in my U.S. Pat. No 28,458, reissued July 1, 1975. In that patent a method of increasing the filter run of a particulate media filter is materially improved by creating currents sweeping over the media surface. The patent is incorporated by reference herein as the general art to which the present invention is directed.

A further imrovement to the filter described in my U.S. Pat. No. 28,458 is disclosed and claimed in my U.S. Pat. No. 3,817,378 issued June 18, 1974. In this patent, which is also incorporated as reference, there is disclosed a waste water filter wherein air is forced upwardly through the filter bed between the backwash cycles thereby regenerating the filter media surface, and increasing the length of the filter run between backwashes.

Treated unfiltered waste water may contain substantial quantities of grease and oil in addition to varying quantities of suspended solids.

Researchers in the waste water treatment field claim that the single most abundant ingredient in domestic sewage may be grease. The classes of compounds generally found in the sewage grease fraction include hydrocarbons, glycerides, sterols, fatty acids and compound lipids. Because most of these compounds are insoluble in water, the exist on an emulsion uniformily dispersed in water, or as a separate layer which in part may have coalesced into grease balls.

A portion of grease present in waste water is in the form of a colloid or a supracolloid. this colloidal and supracolloidal fraction of grease may represent as much as one fourth to one half of the total grease fraction present in the waste water. This grease emulsion may be further strengthened by large quantities of detergent or other emulsifying agents present in the waste water.

Quantities of grease varying at times to substantial amounts may then be discharged from sewage treatment plants, along with varying quantities of solids, as a function of design, loading and operation of these treatment works.

Waste treatment plant effluent containing significant amounts of colloidal or coalesced grease add a new and difficult dimension to the waste water filtration process.

The grease fraction will penetrate into the filter media, the interfacial film between the colloidal droplets and the treatment plant effluent if physically broken, due in part, to the tortuous path formed by the media grains. Once the interfacial film is broken the grease droplets will coalesce on the grain surface. The speed with which this interfacial film is broken is, in part, a function of strength of the emulsifier present in the waste water. This adhesion of grease to the media will form in a tenacious film around the media grain.

This tenacious grease film will cause the very fine media to adhere together forming clumps that block passage of air or water. This grease film will also cause media grains to attract and hold suspended solids to the grain surface, the film acting as a binder with other grains to block flows of air and water in all directions.

This packing of filtering media will quickly reduce the efficiency of the filter, and in turn will cause air and water rising in any cleaning cycle to flow around the tightly packed media volumes, reducing or negating the effectiveness of the cleaning cycle.

An improvement in filter underdrain structure is described and claimed in my U.S. Pat. No. 3,840,117 dated Oct. 8, 1974, wherein air is distributed upwardly in an even manner over the total area of the media bed to periodically remove plugged or packed areas of the bed. The underdrain also eliminates the possibility of high velocity channelling around densely packed media through uneven distribution of air or backwash liquid.

Commonly used filter underdrain structures are designed to develop even distribution of backwashing water throughout the filter area, generally at wash rates that may vary from 15 to 30 gallons per minute. These backwash rates represent a rising velocity of 24 to 48 inches per minute or velocities much less than 1 inch per second. This low energy wash velocity is easily diverted around the grease packed areas within the media bed.

A further improvement is also described and claimed in my U.S. Pat. No. 3,840,117 wherein the backwashing liquid flows as a series of separate high velocity liquid jets passing upwardly in a generally vertical direction, acting as augers boring upwardly, the jets being closely spaced providing a uniform cleaning action of the media.

The various grease clogged volumes within the filtering media remain generally intact following backwashing by the conventional means described irrespective of the backwash rates. These filters will quickly become clogged again. These short filter runs can be lengthened by increasing the effective size of the media, or chemical cleaning the media. Increasing the media size will sacrifice filtrate quality. Chemical cleaning the media is difficult.

The grease build up in filter media has been at times identified as slime, and operator and treatment plant designers have recommended pre-chlorination of the treated waste in an attempt to retard "slime" growth. In effect, the operator is attempting to strengthen the emulsion, and thereby allowing some grease to pass through the media. This technique is of course productive, and has limited success, primarily with coarse media. Prechlorination may cause deeper penetration of grease in very fine media.

Increasing filter media size will permit longer runs at reduced quality, but the media grains will still coat with grease causing high velocity channels during the backwash with some media loss, the filter, however, will eventually still have to be chemically cleaned.

The underdrain improvement described in my U.S. Pat. No. 3,840,117 backwashes fine filter media without the severe problems associated with conventional underdrains. However, after a period of time a very fine grease film will develop on the media grains. Eventually, the media must be chemically cleaned.

Filter cells are cleaned coventionally, by closing the filter drain, adding a chemical cleaning solution to the filter inlet, and/or sprinkling some cleaning solution on to the media. The cleaning solution must be worked into the media, generally by hand to insure the complete immersion of each media grain in the solution. The fact that personnel must enter the filter cell may be dangerous, yet required, and especially so if sodium hypochlorite is used as the cleaning solution. Eventually, the media may also have to be replaced.

All of these disadvantages are overcome by the present invention which is directed toward a waste effluent filter of the type preferably utilizing a particulate filter bed and an underdrain structure as described in my U.S. Pat. No. 3,840,117. The present invention is also directed towards waste effluent filters utilizing conventional even flow type underdrain systems.

SUMMARY OF THE INVENTION

In accordance with the preferred embodiment of the present invention there is provided an improvement in a filter of the type generally including a tank having a lower portion, a filter bed of particulate material (media) having an upper surface, and an underdrain structure supporting the particulate material, an underdrain cavity coextensive with the underdrain structure, means for draining the underdrain cavity, means for allowing air to enter the underdrain cavity, means for forcing liquid into the underdrain cavity, means to distribute air upwardly uniformly irrespective of clogged or plugged condition, means to distribute vertical jets into the media, the improvement comprising means to force chemical cleaning solution into the underdrain cavity, means to force water into the underdrain cavity mixing the cleaning solution with water and forcing the admixture of cleaning solution and water upwardly into the particulate media following the complete evacuation of air previously trapped in uniformly spaced compartments. The invention also includes means to stop the flow of cleaning solution into the media, and means to permit the media to soak in the cleaning solution, the means to create jet augers for short periods, followed by additional soaking means to completely emulsify the tenacious grease film on each media grain, and means to backwash the emulsified grease from the particulate media and for a time period that may be longer or shorter than the normal backwash time.

BRIEF DESCRIPTION OF THE DRAWINGS

FIG. 1 is a view in side elevation showing the preferred embodiment of the present invention in the normal filtering operation;

FIG. 2 is a view similar to FIG. 1 showing initial chemical cleaning solution being added to the underdrain cavity at the start of the cleaning cycle;

PREFERRED EMBODIMENT OF THE INVENTION

Figure 4:
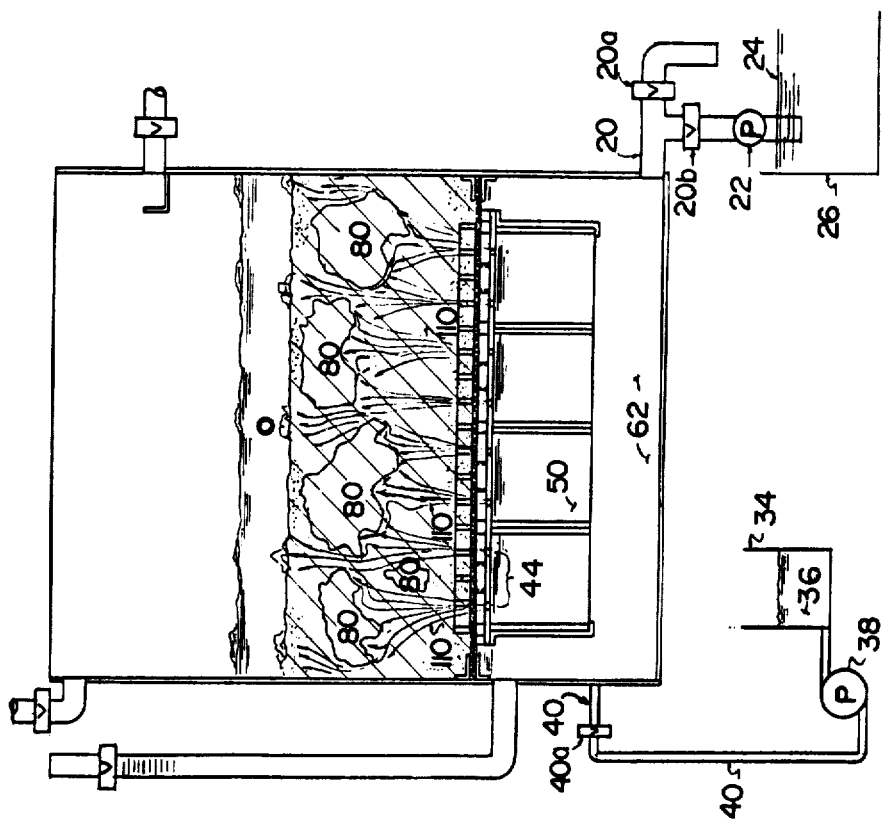
FIG. 4 is a view similar to FIG. 1 showing cleaning solution and water entering the filtering media.

Referring now to the drawings wherein the showings are for the purpose of illustrating a preferred embodiment of the invention only and not for the purpose of limiting same. FIG. 1 illustrates a filter A for filtering waste effluent prior to eventual disposal into the receiving waters. In accordance with the preferred embodiment of the invention the filter includes a tank 10, particulate media which may be but is not limited to sand 12, having an upper surface 14. There is an underdrain cavity 16, having a lower wall 18. In the underdrain cavity there is provided an outlet 20 which is connected to a backwash pump 22 having a source of clean filtered effluent 24 in a tank 26, for the purpose of backwashing the filter bed 12. A vave 20a in outlet 20 controls the flow of liquid from the underdrain cavity 16 to tank 26, and valve 20b controls flow from pump 22 to the cavity 16. A waste effluent inlet valve 30a in inlet conduit 30 adjacent the top of the tank controls the flow of treated waste effluent into the filter. A backwash outlet 27 is also located above the surface 14, a valve 27a controlling the operation of the backwash outlet, which is generally connected to a backwashed water receiving tank, not shown. Also, there is an air diffuser located over the surface 14 for the purpose of creating currents in the body of the effluent over this surface in accordance with my prior U.S. Pat. No. Re 28,458. Also, there is located an underdrain support asembly 60, in accordance with my U.S. Pat. No. 3,840,117. The surface currents hold suspended solid particles that were removed during the pulse cleaning operation which is described in my U.S. Pat. No. 3,817,378. A conduit 32 allows air to enter the underdrain cavity 16 to fill space not filled by filtered effluent 24 passing through bed 12. Conduit 32 may be extended to contain a column of liquid to correspond to the pressures applied to the underdrain cavity 16, or an air vent valve 32a may be installed at the vent outlet to permit flow of air in both directions and prevent the flow of liquid when pressure is applied to the filter effluent within the underdrain cavity.

In accordance with the present invention, as shown in FIG. 1, there is provided a chemical feed inlet 40 which is connected to a chemical storage tank 34. A pump 38 in conduit 40 to force chemical 36 into conduit 40, and a valve 40a controls the flow of the chemical into underdrain cavity 16.

In operation, the treated effluent inlet valve 30a is closed, the liquid level 100 over media surface 14 is allowed to drain down and then the outlet valve 20a is closed. Pump 38 is energized and valve 40a is opened allowing the chemical cleaning solution to enter the underdrain cavity 16, and mix with residual filtered effluent 24, forming an admixture 62, see FIG. 2.

The volume of chemical solution entering the underdrain is established either by observing the change in volume in chemical storage tank 34, or automatically energizing chemical feed pump 38 for a timed sequence for a given pump capacity.

After the chemical volume has been discharged to underdrain cavity 16, the chemical feed pump 38 is de-energized, backwash pump 22 is then energized, valve 20b is opened and filtered effluent 24 is pumped into underdrain cavity 16.

Figure 3:
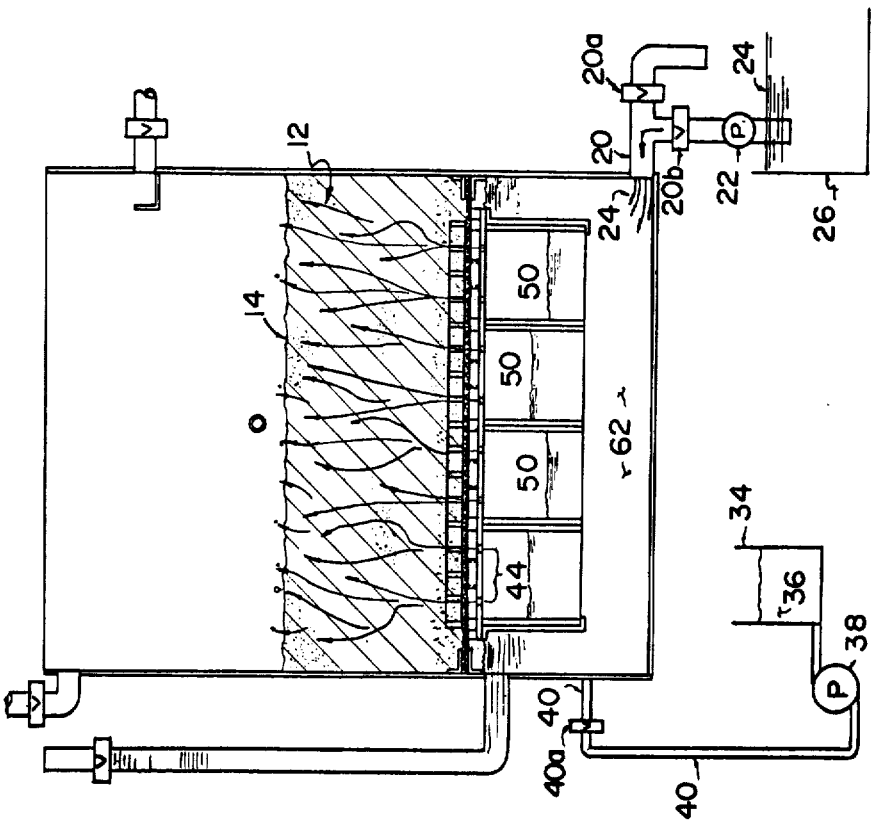
FIG. 3 is a view similar to FIG. 1, showing initial trapped air volume being forced upward by rising a mixture of cleaning solution and water.

Referring now to FIG. 3, filtered effluent 24 entering underdrain chamber 16, mixing with chemical admixture 62 will trap air in the underdrain compartment 50 of the underdrain assembly 60. This atmospheric air is compressed against the resistance of the particulate bed 12, and is discharged upwardly into the media bed 12, and through media surface 14.

Referrng now to FIG. 4, after all the air trapped in compartments 50 is expelled into the particulate media 12, the chemical admixture 62 enters the media, this flow of liquid upwardly enters the media as a liquid jet lifting and cracking the clogged and packed sections of the media. The chemical admixture flows around the packed sections 80 and after the entire bed 12 is submerged, the backwash pump 22 is de-energized and valve 20b is closed.

Figure 5:
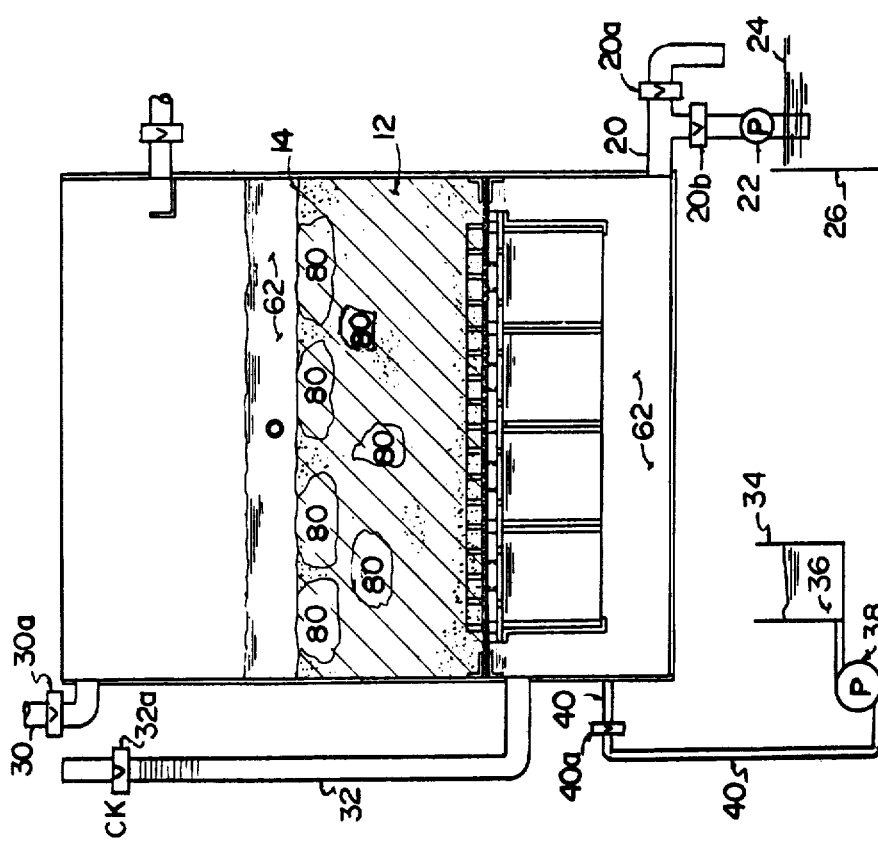
FIG. 5 is a view similar to FIG. 1 showing cleaning solution and media in soaking condition.

Referring now to FIG. 5, the particulate media is submerged entirely with the cleaning admixture 62. All valves in and out of the filter are closed, this soaking period is timed allowing chemical admixture 62 to penetrate into clogged and packed areas 80. After a pre-set period of soaking, the backwash pump 22 is again energized and valve 22b is opened.

Figure 6:
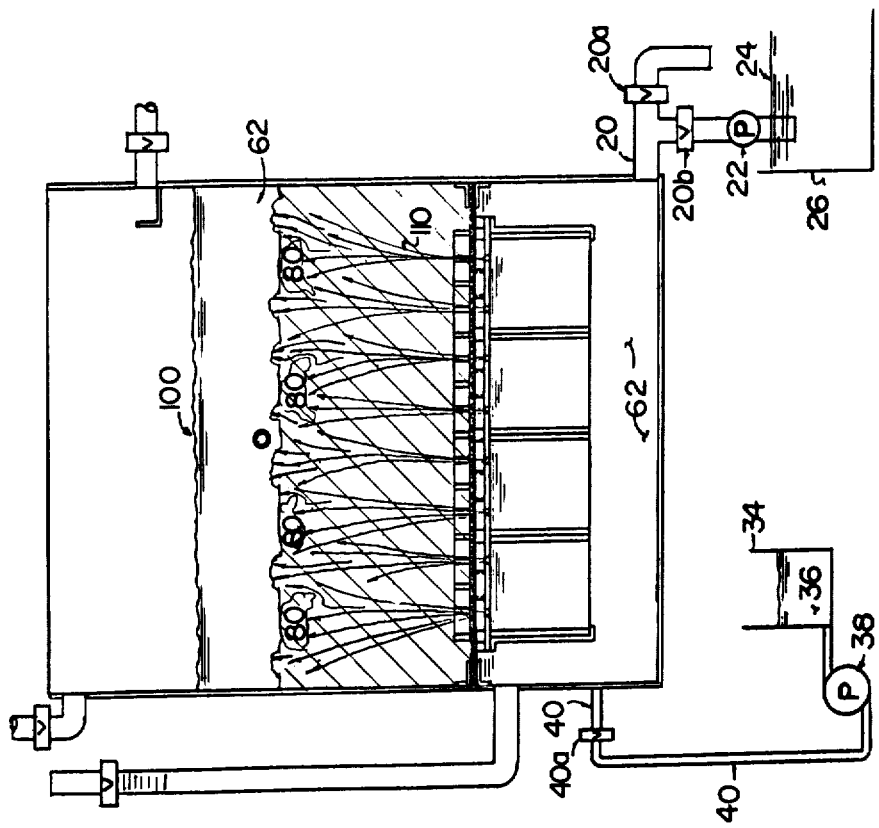
FIG. 6 is a view similar to FIG. 1 showing auger jets in the filter media.

Referring now to FIG. 6, the high velocity jets 110 auger into the plugged and clogged sections 80 of the media 12 allowing thorough contact of the particulate grains with the chemical admixture 62.

The backwash pump is then de-energized and the media and admixture is allowed to soak again for an additional pre-set but adjustable time. After the soaking time period has expired, the backwash pump 22 is again energized, creating jet augers for a timed period followed by an additional soak time period.

Figure 7:
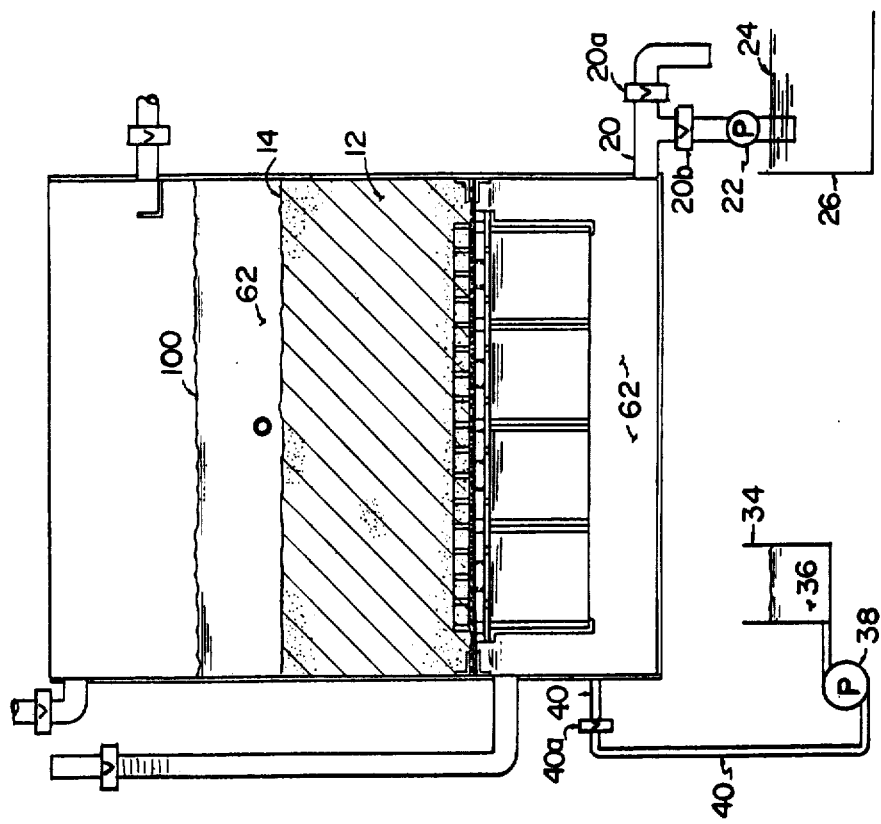
FIG. 7 is a view similar to FIG. 1 showing cleaning solution and media in a soaking condition.

Referring to FIG. 7, this alternation of jets and soaking permits each particle of particulate media in the entire bed to thoroughly come in contact with the chemical cleaning solution, thereby allowing the chemical solution to reemulsify the grease film in order that the film may be lifted off the surface of the media grains.

Figure 8:
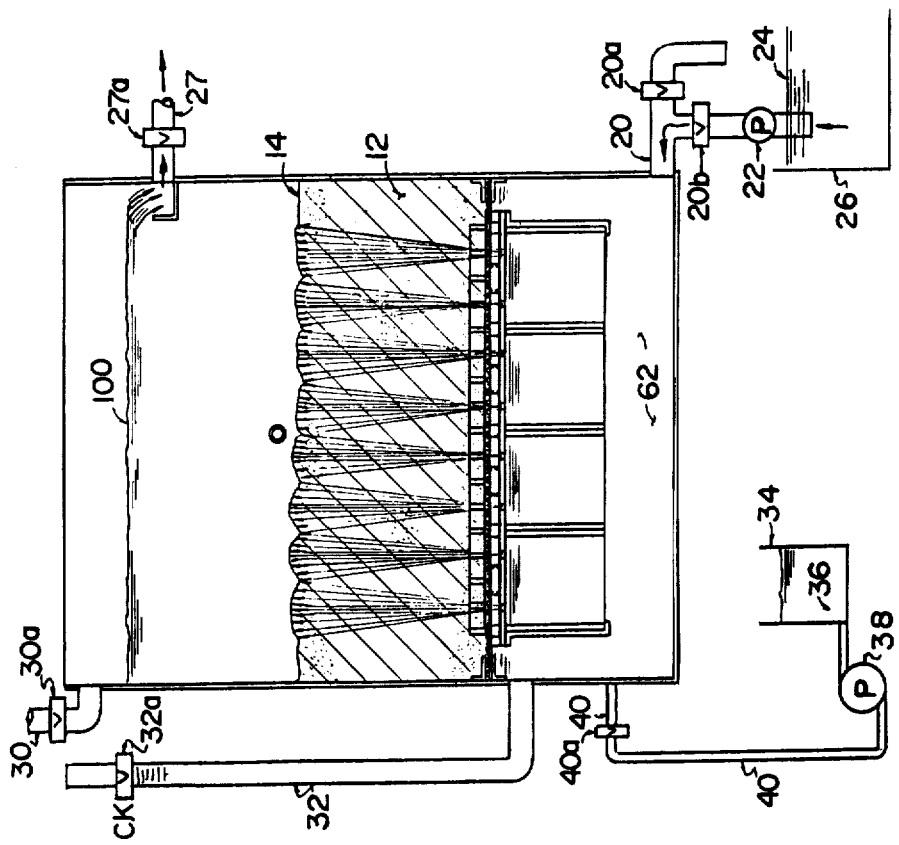
FIG. 8 is a view similar to FIG. 1 showing backwashing of the filter media.

Referring now to FIG. 8, following the appropriate soak period time, the filter cell is backwashed by energizing pump 22, valve 20b and valve 27a allowing backwashed water chemical clean solution and the reemulsified grease to wash out to the backwash holding tank not shown.

At the end of the backwash time period an audible signal is energized informing the operator that the cleaning cycle is complete, pump 22 is de-energized, valve 20b is closed, valve 20a is opened and the filter cell is permitted to drain down, the time that is required for the water to reach the media surfce 14 is an indicator of the cleanliness of the media. Generally drain down rats in excess of 15 ga./min per sq. ft. (24 inches per min.) are satisfactory. Shorter periods would indicate that the cleaning cycle should be repeated, cleaning solution strengthened, or more jet and longer soak periods be programmed.

Various chemical cleaning solutions may be used. The plating of grease and oil on to the surface of the particulate media grain is a surface phenomenon, and the surface of the grain must come into contact with a strong emulsifying agent to be removed. Soap, gelatin, and other hydrophilic sols are useful emulsifying agents.

Sodium or calcium hypochlorite are common grease cleaners usually found at sewage treatment plants. Cleaning filter media with even these very strong solutions is slow and difficult, and the high quantity of chlorine gas released can be hazardous.

In accordance with the present invention a dilute solution of a conventional chemical solution such a sodium hypochlorite with varying quantities of sodium phosphate compounds when used in the above described process, reduces the contact time required from hours to minutes in order to thoroughly emulsify the fine grease film on the sand grain. An admixture of 90% sodium hypochlorite and 10% sodium phosphate compounds can be diluted down to a range of 500 to 100 mg/l free chlorine depending on the specific grease load is an ideal filter cell cleaner. Contact time may range from only 5 to 30 minutes.

Another aspect of this invention is the simplified control of the process allowing the operator to quickly program the chemical strength, proper jet auger and soak cycles for whatever grease loads are present in the media.

A variety of control circuits may be used for controlling the sequencing of the chemical feed water fill, jet, soaking, and backwash operations. The control system may also be modified to also feed chemical solution simultaneously with water feed, and the jet sequences in order to strengthen the cleaning solution. For purposes of explanation, a simplified control system is illustrated in FIG. 9.

Figure 9:
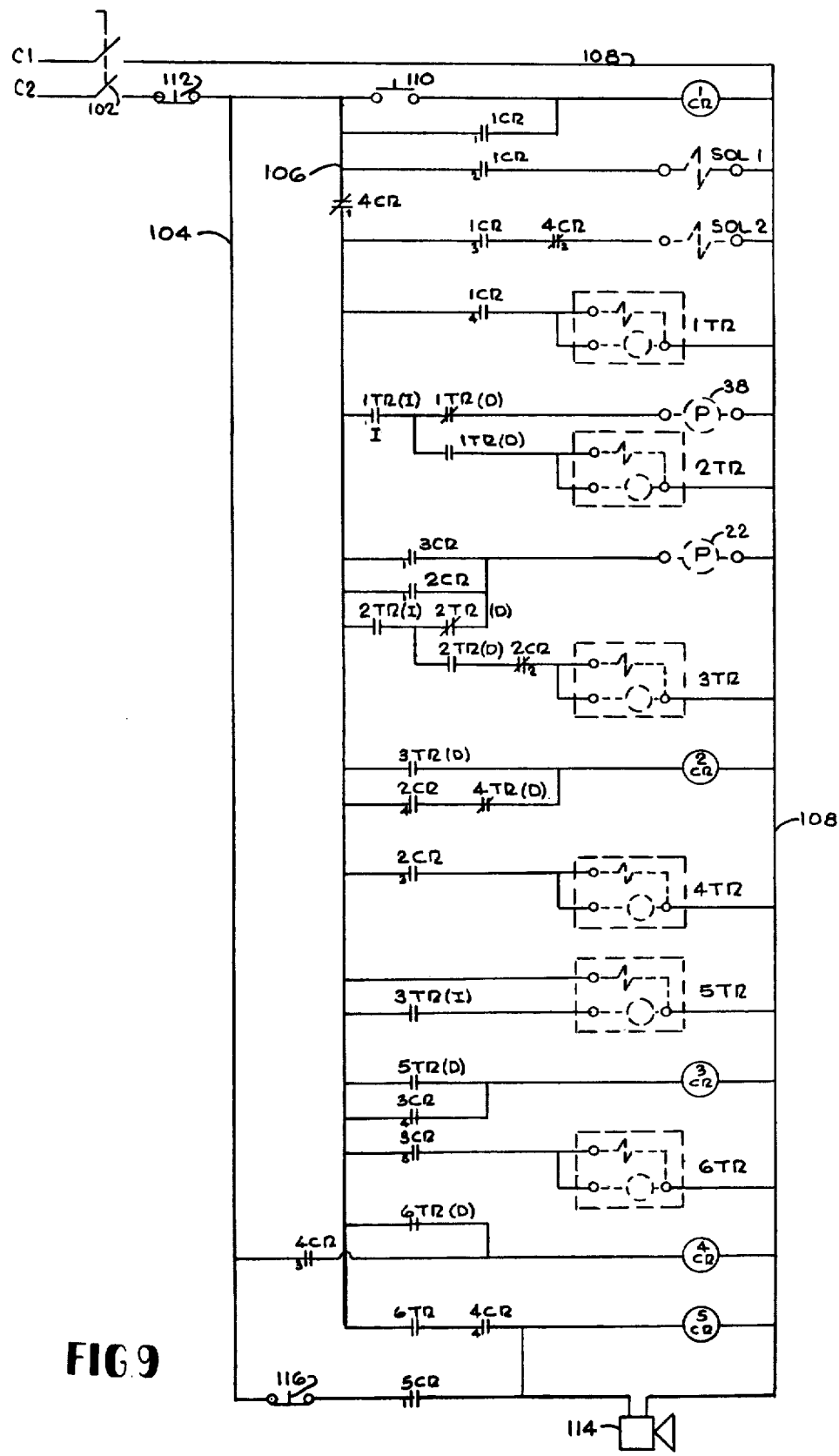
FIG. 9 is a schematic wiring of simplified control cycle.

Referring now to FIG. 9, a single phase input circuit L1, L2, is connected on to the circuit by connector 102. This closes circuits 104, and 106 to 108. The clean cycle is energized by depressing push button 110 which energizes relay 1CR, which in turn holds itself on through contact 1CR-1. Relay 1CR energizes sol 1, which closes inlet valve 32a and opens valve 27a, and solenoid valve sol 2, which closes underdrain valve 20b. Relay 1CR, also starts timer 1TR by contact 1CR-4. Timer contact 1TR(I) starts the chemical pump 38. At the end of the time period on timer 1TR, 1TR(D)NC will open and stop pump 38, and energize timer 2TR. Timer contact 2TR(I) will close, and pump 22 will be energized for the period of time indicated on timer 2TR. At the end of timed cycle 2TR, 2TR(D) will close and energize timer 3TR. This is the soak time, and all systems remain at rest during this timed cycle. At the end of timed period on timer 3TR, contact 3TR(D) closes and energizes relay 2CR which holds itself on through contact 2CR-4 and starts the jet timer 4TR. Relay 2CR also resets timer 3TR by opening contact 2CR-2(NC). After the timed period, usually 10 to 15 seconds, timer 4TR times out, opening contact 4TR(D) and de-enerigzing relay 2CR, this action automatically restarts soak timer 3TR. This circuitry directs the timers 3TR and 4TR and their respective functions to alternate indefinitely. However, each time the soak timer 3TR is energized the accumulator timer 5TR motor is driven by closing contact 3TR(I). The length of the sum of all appropriate cleaning cycles is then dialed timer 5TR. When timer 5TR has timed out relay 3CR is energized and holds itself on through contact 3CR-4, and energizes backwash timer 6TR. Relay 3CR starts backwash pump 22 through contact 3CR-1. At the end of backwash cycle, backwash timer contact 6TR(D) is closed energizing relay 4CR which holds itself on, energizes audio horn 114 and shuts all timer cycles by opening contact 4CR-1. The audio signal will remain energized until push button 116 is depressed. After the operator has inspected the filter cell, he may return the cell to service by depressing push button 112.

I claim:

1. Apparatus for the removal of grease and oil film from granular media surfaces in waste water filters comprising a filter, said filter includng a tank having a lower portion, a filter bed of particulate material within said tank above said lower portion, said filter bed having an upper surface, an underdrain structure in the tank adjacent said lower portion and under said bed, an underdrain cavity within said lower portion coextensive with the underdrain structure, means for draining from the underdrain cavity filtered effluent after said filtered effluent has passed through said bed, means for forcing backwashing liquid into the underdrain cavity, means for forcing a predetermined quantity of cleaning solution into the underdrain cavity.

means to intermittently energize said liquid forcing means to hydraulically disturb said bed of particulate material in contact with cleaning solution, means to stop said liquid forcing means for a predetermined soak time, and means to initiate a predetermined backwash cycle following a predetermined number of liquid forcing cycles and respective soak periods.

2. Apparatus of claim 1 including means providing for trapping air in the underdrain structure.

3. The apparatus of claim 1 including means to force the cleaning solution in jets into the media.

4. The apparatus of claim 3 including means to operate the jets into the filter media in alternation with soaking periods.

5. The apparatus of claim 1 including soaking means to emulsify any tenacious grease film on the media grain.

6. The apparatus of claim 1 including means for backwashing emulsified grease from the particulate media.

7. The apparatus of claim 1 including means to apply air under pressure to the under structure.

8. The apparatus of claim 7 including an external source of air under pressure

9. The apparatus of claim 1 including means to force the cleaning solution in jets into the filter media, said jets including at least some of the trapped air.

10. The apparatus of claim 1 including means to compress air against the resistence of the particulate filter from underneath it.

11. The apparatus of claim 10 including means to apply pressure to the cleaning solution to trap air, the air being forced into the filter media thereby.

12. The method of removing oil and grease film from the granular surfaces of particulate media for filtering waste water in a waste filter wherein a filter bed is provided with an underdrain cavity including the steps of a. forcing a predetermined quantity of a chemical cleaning agent into the underdrain cavity, b. forcng a backwashing liquid into the underdrain cavity and up through the filter bed to substantially inundate the bed, c. stopping the flow of backwashing liquid for a predetermined period, d. hydraulically disturbing said bed of particulate material in contact with said liquid cleaning solution by forcing additional backwashing liquid into said underdrain cavity, e. stopping the flow of backwashing liquid for a predetermined soaking period, f. and initiating a predetermined backwash cycle following a predetermined number of cycles including steps d and e.

13. The method of claim 12 including providing air under pressure in the underdrain cavity.

14. The method of claim 13 wherein the air is provided from an external source.

15. The method of claim 12 including trapping air under the filter bed by means of the cleaner.

16. The method of claim 12 wherein the cleaner is a solution of sodium hypochlorite.

17. The method of claim 16 including adding a detergent to the cleaner, up to 10%.

18. The method of claim 12 including soaking the filtering media with the cleaning admixture.

19. The method of claim 18 including the step of utilizing variable periods of soaking alternately with periods of forcing the chemical admixture into and through the filter bed.

* * * * *